United States Patent
Disch et al.

(10) Patent No.: US 10,456,007 B2
(45) Date of Patent: Oct. 29, 2019

(54) CONVEYOR DISHWASHER AND METHOD FOR OPERATING A CONVEYOR DISHWASHER

(71) Applicants: Harald Disch, Elzach (DE); Martin Schrempp, Gengenbach (DE)

(72) Inventors: Harald Disch, Elzach (DE); Martin Schrempp, Gengenbach (DE)

(73) Assignee: ILLINOIS TOOL WORKS INC., Glenview, IL (US)

(*) Notice: Subject to any disclaimer, the term of this patent is extended or adjusted under 35 U.S.C. 154(b) by 269 days.

(21) Appl. No.: 15/309,806

(22) PCT Filed: May 5, 2015

(86) PCT No.: PCT/US2015/029148
§ 371 (c)(1),
(2) Date: Nov. 9, 2016

(87) PCT Pub. No.: WO2015/171545
PCT Pub. Date: Nov. 12, 2015

(65) Prior Publication Data
US 2017/0143182 A1    May 25, 2017

(30) Foreign Application Priority Data

May 9, 2014 (DE) .................. 10 2014 208 813

(51) Int. Cl.
*A47L 15/42* (2006.01)
*A47L 15/24* (2006.01)
*A47L 15/00* (2006.01)

(52) U.S. Cl.
CPC ....... *A47L 15/4291* (2013.01); *A47L 15/0078* (2013.01); *A47L 15/241* (2013.01); *A47L 15/4219* (2013.01)

(58) Field of Classification Search
CPC ............ A47L 15/241; A47L 15/4291; A47L 15/0078; A47L 15/4219; Y02B 30/52
See application file for complete search history.

(56) References Cited

U.S. PATENT DOCUMENTS

| 8,226,777 B2 | 7/2012 | Gaus et al. |
| 2009/0101174 A1 | 4/2009 | Gaus et al. |
| (Continued) | | |

FOREIGN PATENT DOCUMENTS

| CN | 101543390 | 9/2009 |
| DE | 30 19 922 C2 | 9/1989 |
| (Continued) | | |

OTHER PUBLICATIONS

PCT, Preliminary Report on Patentability, International Application No. PCT/US2015/029148; dated Nov. 24, 2016, 8 pages.

(Continued)

*Primary Examiner* — Benjamin L Osterhout
(74) *Attorney, Agent, or Firm* — Thompson Hine LLP (57) ABSTRACT

A conveyor dishwasher (1) has at least one wash zone (11, 12) in which wash liquid is sprayed onto the washware, at least one final rinse zone (14) in which final rinse liquid is sprayed onto the washware and a waste air system (20) for discharging waste air from the conveyor dishwasher (1). To save energy and maintain hygiene performance, a waste water heat recovery system (25) is provided for transferring at least a portion of the thermal energy in the waste water from the conveyor dishwasher (1) as useful heat to the final rinse liquid and a waste air heat recovery system is further provided for transferring at least a portion of the thermal energy in the waste air which is discharged or is to be discharged from the conveyor dishwasher (1) as useful heat to at least the final rinse.

19 Claims, 2 Drawing Sheets

(56) References Cited

U.S. PATENT DOCUMENTS

| | | |
|---|---|---|
| 2009/0151750 A1 | 6/2009 | Ecker et al. |
| 2009/0242005 A1 | 10/2009 | Gaus |
| 2010/0139690 A1* | 6/2010 | Gaus .................. A47L 15/0013 134/1 |
| 2011/0132408 A1* | 6/2011 | Disch ................. A47L 15/0026 134/25.2 |
| 2011/0203616 A1* | 8/2011 | Berner ................. A47L 15/241 134/25.2 |
| 2013/0240001 A1* | 9/2013 | Padtberg ............. A47L 15/0092 134/127 |
| 2013/0247940 A1* | 9/2013 | Padtberg ............... A47L 15/245 134/25.2 |
| 2014/0034088 A1* | 2/2014 | Padtberg ............... A47L 15/241 134/25.2 |
| 2015/0101639 A1 | 4/2015 | Heppner |

FOREIGN PATENT DOCUMENTS

| | | |
|---|---|---|
| DE | 102004046758 | 4/2006 |
| DE | 10 2012 211 442 A1 | 1/2014 |
| DE | 10 2008 015 798 B4 | 6/2015 |
| EP | 2050381 | 4/2009 |

OTHER PUBLICATIONS

PCT, International Search Report and Written Opinion, International Application No. PCT/US2015/029148, 10 pages, dated Aug. 5, 2015.

* cited by examiner

Fig. 1

Fig. 2

CONVEYOR DISHWASHER AND METHOD FOR OPERATING A CONVEYOR DISHWASHER

CROSS-REFERENCE TO RELATED APPLICATIONS

This application is a National Stage filing of International Application No. PCT/US2015/029148, filed May 5, 2015, which claims priority of German Application No. 10 2014 208 813.5, filed May 9, 2014, which are incorporated herein by reference in their entireties.

The present invention relates to a conveyor dishwasher, in particular a commercial conveyor dishwasher.

Accordingly, the invention relates in particular to a conveyor dishwasher having a conveying apparatus for conveying washware through the individual treatment zones of the conveyor dishwasher, wherein the conveyor dishwasher has at least one wash zone in which wash liquid from a wash tank which is associated with the wash zone is sprayed onto the washware. The generic conveyor dishwasher further has at least one final rinse zone which is arranged downstream of the at least one wash zone as seen in the conveying direction of the washware and in which final rinse liquid is sprayed onto the washware. Furthermore, the conveyor dishwasher has a waste air system in order to discharge waste air that accrues during operation of the machine from the conveyor dishwasher.

A conveyor dishwasher (or "conveyor warewasher") according to the present invention is in particular a flight-type dishwasher (or "flight-type warewasher") or a rack-conveyor dishwasher (or "rack-conveyor warewasher").

A conveyor dishwasher of the type mentioned at the beginning is known in principle from the prior art and is usually used in the commercial field. In contrast to what are known as box-type dishwashers in which the washware which is to be cleaned remains in a fixed position in the machine during cleaning, in conveyor dishwashers, the washware is transported through various treatment zones of the conveyor dishwasher.

A conveyor dishwasher usually has, as treatment zones, at least one prewash zone and at least one main-wash zone which is arranged downstream of the prewash zone(s) as seen in the conveying direction of the washware. At least one final rinse zone is as a rule arranged downstream of the main-wash zone(s) as seen in the conveying direction.

It is also known to additionally provide at least one post-wash zone or pre-rinse zone between the main-wash zone and the final rinse zone.

As seen in the conveying direction of the washware, the washware, which is either received directly on a conveying belt or is retained by racks, usually runs through an inlet tunnel, the following prewash zone(s), main-wash zone(s), optionally provided post-wash zone(s), final rinse zone(s), and a drying zone, into an outlet section.

The abovementioned wash zones (prewash zone(s), main-wash zone(s) and optionally provided post-wash zone(s)) of the conveyor dishwasher each have an associated wash system which has a wash pump and a line system connected to the wash pump, wash liquid being fed to corresponding spray nozzles of the wash zones via said line system. The wash liquid fed to the spray nozzles is sprayed onto the washware, which is conveyed through the respective wash zones by a conveying apparatus of the conveyor dishwasher, in the respective wash zone.

Each wash zone has an associated wash tank in which sprayed liquid is accommodated and/or in which liquid for the spray nozzles of the relevant zones is provided.

In the conveyor dishwashers known from the prior art, final rinse liquid in the form of fresh water, which may be pure or mixed with further additives, for example rinse aid, is sprayed onto the washware via the spray nozzles of the final rinse zone. At least some of the sprayed final rinse liquid is transported from treatment zone to treatment zone, counter to the conveying direction of the washware, via a cascade system.

The sprayed final rinse liquid is collected in a tank (post-wash tank) of the post-wash zone, it being conveyed from said tank to the spray nozzles (post-wash nozzles) of the post-wash zone via the wash pump of the wash system belonging to the post-wash zone. In the post-wash zone, wash liquid is rinsed off the washware. The liquid that accumulates in the process flows into the wash tank of the at least one main-wash zone, which is arranged upstream of the post-wash zone as seen in the conveying direction of the washware. Here, the liquid is usually provided with a detergent and is sprayed onto the washware by a pump system (wash pump system) belonging to the wash system of the main-wash zone via the nozzles (wash nozzles) of the main-wash zone.

The liquid then flows as long as no further main-wash zone is provided—from the wash tank of the main-wash zone into the prewash tank of the prewash zone. The liquid in the prewash tank is sprayed onto the washware by way of a pump system belonging to the wash system of the prewash zone via the prewash nozzles of the prewash zone, in order to remove coarse dirt from the washware.

In the field of commercial dishwashing, there are various standards and guidelines in which the requirements with regard to the hygiene performance of cleaning processes and the procedure tests thereof are defined. A common feature of all standards and guidelines is that, during the cleaning process, minimum temperatures are stipulated in the wash and rinse zones of the commercial dishwasher. In this way, thermal disinfection, inter alia, is intended to at least partially occur.

The requirements with regard to the stated minimum temperatures in the relevant treatment zones of the conveyor dishwasher mean that a relatively large amount of energy needs to be used during operation of the commercial dishwasher in order to heat the wash and rinse liquids to the required minimum temperatures. In addition, in the currently known conveyor dishwashers, up to 55% of the energy introduced during operation of the conveyor dishwasher is emitted as lost heat to waste water and waste air.

On the basis of the circumstances, the present invention is based on the object of developing a conveyor dishwasher of the type mentioned at the beginning such that resources, in particular energy, can be saved during operation of the machine, specifically while maintaining the hygiene performances which apply for commercial dishwashing and are required in the corresponding standards and guidelines. Furthermore, a corresponding method for operating such a conveyor dishwasher is intended to be specified.

Accordingly, a conveyor dishwasher of the type mentioned at the beginning is proposed, that is to say a conveyor dishwasher which has at least one wash zone and at least one final rinse zone and furthermore a waste air system for discharging waste air from the conveyor dishwasher, wherein, in order to save resources during operation of the conveyor dishwasher, a waste water heat recovery system and in addition thereto a waste air heat recovery system are provided according to the invention. The waste water heat recovery system is configured to transfer at least a portion of the thermal energy in the waste water that accumulates during the operation of the conveyor dishwasher as useful heat to the final rinse liquid which is to be sprayed in the at least one final rinse zone. In addition, the waste air heat recovery system is configured to transfer at least a portion of the thermal energy in the waste air which is discharged or is to be discharged from the conveyor dishwasher as useful heat to at least the final rinse liquid which is to be sprayed in the one final rinse zone.

The advantages that are achievable with the solution according to the invention are obvious: as a result of the provision of a waste air heat recovery system, the energy efficiency of the conveyor dishwasher is optimized in that evaporation losses are minimized. In this case, consideration should be given to the fact that in a conventional conveyor dishwasher—depending on the machine configuration and machine size—up to about 10 to 15 kW of energy is "lost" through the waste air during operation of the machine, i.e. is discharged unused without recovery via the machine-side and/or on-site waste air system.

In a preferred embodiment of the solution according to the invention, it is proposed to use the heat pump technique during waste air heat recovery, in order to recover, in a particularly efficient manner, at least a portion of the energy stored in the waste air which is to be discharged from the conveyor dishwasher. In this case, consideration should be given to the fact that the waste air which is to be discharged from the conveyor dishwasher is a warm and humid air stream which is not discharged unused to the outside according to the solution according to the invention, but rather is guided via or through an evaporator of a heat pump device. In this case, the machine waste air is preferably cooled to no lower than 18° C. at a relative air humidity of 100%.

As a result of the transfer of energy from the waste air to the refrigerant of the heat pump device, the refrigerant evaporates in the evaporator of the heat pump device. Following complete evaporation and superheating in the gaseous state, the refrigerant is subsequently compressed in a heat pump compressor of the heat pump device and brought to a higher pressure and temperature level.

According to the solution according to the invention, on the high-pressure side of the heat pump device, the thermal energy which was previously transferred from the machine waste air to the refrigerant is emitted at least partially as useful air to the final rinse liquid which is to be sprayed in the at least one final rinse zone. In this case, the refrigerant of the heat pump device condenses, liquefies and supercools before it expands via an expansion valve of the heat pump device and as a result a low pressure level is achieved.

Since, in the conveyor dishwasher according to the invention, the heat pump technique is used by way of the heat pump device, it is possible to prevent or minimize the evaporation losses, discharged with the waste air, of the conveyor dishwasher, such that as a result the waste air is in an energy neutral form with regard to the atmosphere in the room in which the conveyor dishwasher is installed and thus can be supplied directly to the installation room. Accordingly, it is possible for the conveyor dishwasher to be able to be used without an on-site waste air system, since the waste air of the conveyor dishwasher can be introduced directly into the installation room.

The energy efficiency of the machine can be optimized even further, because, in the solution according to the invention, in addition to the waste air heat recovery system, a waste water heat recovery system is also used, wherein the waste air heat recovery and the waste water heat recovery intermesh and are used synergistically. In a preferred embodiment of the solution according to the invention, the waste water heat recovery system has at least one heat exchanger, which is preferably operated in accordance with the countercurrent principle and serves to transfer at least a portion of the thermal energy in the waste water, which is discharged or is to be discharged from the conveyor dishwasher, as useful heat to the final rinse liquid which is to be sprayed in the at least one final rinse zone of the conveyor dishwasher, and to preheat said final rinse liquid, in order subsequently to heat the final rinse liquid, or heat it further, to the required process temperature with the aid of the thermal energy recovered via the waste air heat recovery system.

In this connection, it is in particular advantageous for the heat exchanger, which is preferably operated in accordance with the countercurrent principle, of the waste water heat recovery system to be arranged upstream in terms of energy of the waste air heat recovery system, so that the final rinse liquid which is to be sprayed in the at least one final rinse zone of the conveyor dishwasher is initially preheated with the aid of the waste water heat recovery system, wherein the temperature level of the final rinse liquid which is to be sprayed in the at least one final rinse zone of the conveyor dishwasher is subsequently raised further with the aid of the waste air heat recovery system.

In a preferred development of the solution according to the invention, a heating device which is associated with the at least one final rinse zone is further provided in order to heat the final rinse liquid which is to be sprayed in the at least one final rinse zone to or above a previously defined or definable final temperature as required. With the aid of this heating device, it is possible to heat the final rinse liquid to the minimum temperature necessary for maintaining the required hygiene performance even when the (thermal) energy recovered with the aid of the waste water heat recovery system and waste air heat recovery system is not sufficient for this purpose.

According to preferred developments of the solution according to the invention, provision is made for the heat pump device of the waste air heat recovery system to have further (additional) heat exchangers which serve to heat the drying air which is introduced or is to be introduced into the drying zone of the conveyor dishwasher and/or to heat the wash liquid which is to be sprayed in the at least one wash zone of the conveyor dishwasher.

With regard to the method, the underlying object is achieved according to the invention in that on the one hand at least a portion of the thermal energy in the waste water which is to be discharged or is discharged from the conveyor dishwasher is transferred as useful heat to the final rinse liquid, which is to be sprayed in the at least one final rinse zone, with the aid of a waste water heat recovery system, and on the other hand at least a portion of the thermal energy in the waste air which is discharged or is to be discharged from the conveyor dishwasher is transferred as useful heat to at least the final rinse liquid, which is to be sprayed in the at least one final rinse zone, with the aid of a waste air heat recovery system.

Exemplary embodiments of the conveyor dishwasher according to the invention are described in more detail in the following text with reference to the appended drawings, in which.

Figure 1:
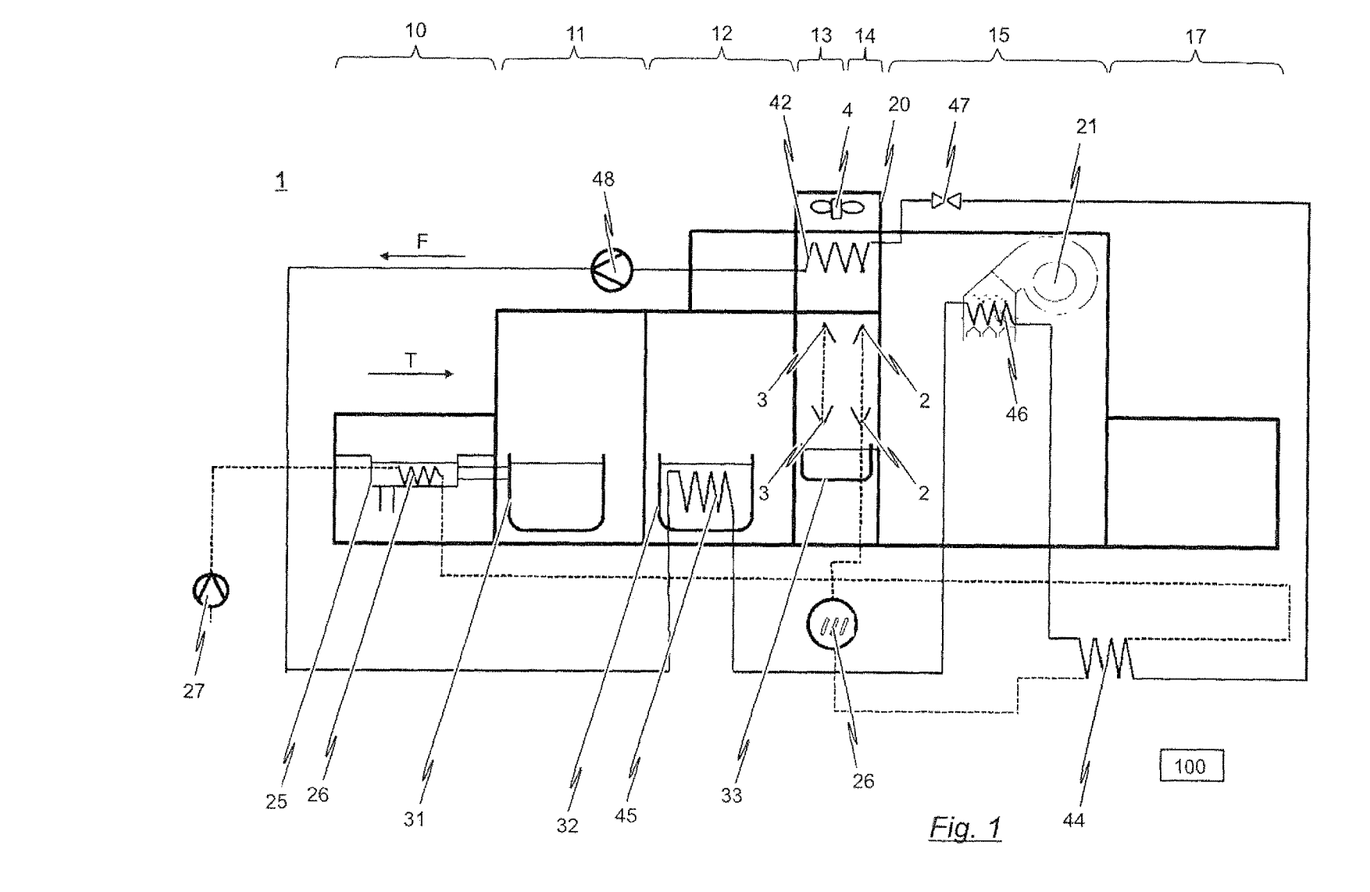
FIG. 1 shows a schematic view of a first exemplary embodiment of the conveyor dishwasher according to the invention.

FIG. 1 shows a schematic longitudinal sectional view of a conveyor dishwasher 1 as an example of the solution according to the invention. The exemplary embodiment of the conveyor dishwasher 1 shown in FIG. 1 has a pre-wash zone 11 and a main-wash zone 12 which is arranged downstream of the pre-wash zone 11 as seen in the conveying direction T of the washware. In the case of the conveyor dishwasher 1 illustrated in FIG. 1, a post-wash or pre-rinse zone 13 and a final rinse zone 14 are arranged downstream of the main-wash zone 12 as seen in the conveying direction T.

As seen in the conveying direction T, the washware, which is either accommodated directly on a conveying belt or is retained by racks, runs through an inlet tunnel 10, the following prewash zone 11, the main-wash zone 12, the post-wash or pre-rinse zone 13, the final rinse zone 14, and through a drying zone 15 into an outlet section 17.

Said treatment zones 11, 12, 13 and 14 of the conveyor dishwasher 1 each have associated spray nozzles via which liquid is sprayed onto the washware which is conveyed through the respective treatment zones 11, 12, 13, 14 by the conveyor belt.

Although not illustrated in the drawings, it is preferred for the spray nozzles for example of the wash system associated with the prewash zone 11 and the main-wash zone 12 each to be formed in an upper and lower wash tube, so that corresponding wash arms are used in these treatment zones 11, 12. It is conceivable in this case for the wash systems that are used to have a multiplicity of wash tubes which form a set of wash arms, wherein the multiplicity of wash tubes are connected to a corresponding wash pump via a preferably common line system.

As indicated in FIG. 1, each wash zone (prewash zone 11, main-wash zone 12, post-wash zone 13) has an associated tank (wash tank 31, 32, 33) in which sprayed liquid is accommodated and/or in which liquid for the spray nozzles of the relevant zones 11, 12, 13 is provided.

The expression "wash zone" used herein should be understood in principle as meaning a treatment zone which has an associated circulation tank (wash tank) and in which the liquid collected in the circulation tank of the treatment zone is circulated with the aid of a wash pump associated with the treatment zone. The expression "wash zone" thus includes the wash zone 11, the main-wash zone 12, but also a post-wash zone 13 optionally arranged downstream of the main-wash zone 12 as seen in the conveying direction T of the washware. The post-wash zone 13 is sometimes also referred to as a "pump final rinse zone" or "prerinse zone" in the field of commercial dishwashing. This is circulating final rinsing which is connected upstream of the final rinsing with fresh water.

By contrast, the expression "final rinse zone" used herein should be understood as being a zone in which final rinsing with fresh water takes place, in which the washware is sprayed with fresh water, to which rinse aid has optionally been added, in order to free the washware of dirt particles and detergent solution without residues.

Figure 2:
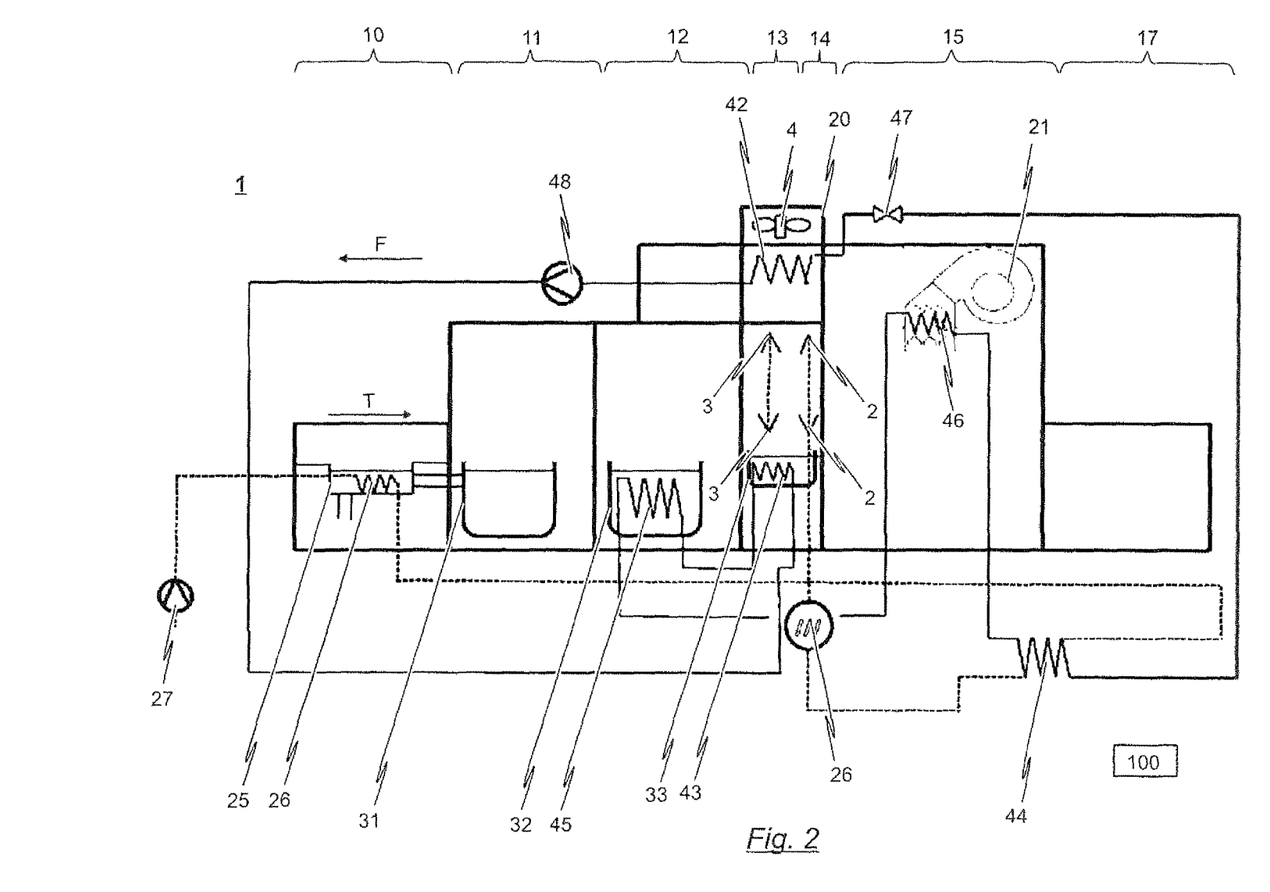
FIG. 2 shows a schematic view of a second exemplary embodiment of the conveyor dishwasher according to the invention.

In the exemplary embodiments illustrated in the drawings, the final washing cycle prior to drying in the drying zone 15 thus takes place in the final rinse zone 14. The drying zone 15 has an associated corresponding fan 21 in order to provide a flow of warm air around the already cleaned washware and as a result to dry the latter.

Furthermore, a control device 100 which is only schematically illustrated in the drawings is provided, said control device 100 serving (inter alia), in the case of the embodiment of the invention illustrated in the drawings, to control the respective wash pumps of the wash zones 11, 12, 13 during a washing process in a suitable manner in order to at least occasionally supply wash liquid to the corresponding spray nozzles via the associated line system.

In the case of the conveyor dishwasher 1 illustrated in FIG. 1, final rinse liquid in the form of fresh water, to which further chemical additives, for example rinse aid, may have been added, is sprayed onto the washware (not illustrated in FIG. 1) via the spray nozzles 2, arranged above and below a conveyor belt, of the final rinse zone 14. Although likewise not illustrated, laterally arranged spray nozzles can also be provided in the final rinse zone 14.

Some of the final rinse liquid sprayed in the final rinse zone 14 is transported from zone to zone, counter to the conveying direction T of the washware, via a cascade system. The rest is passed via a valve and a bypass line directly into the prewash tank 31 of the prewash zone 11 (not illustrated).

The final rinse liquid sprayed in the final rinse zone 14 is collected in the tank (post-wash or pre-rinse tank 33) of the post-wash or pre-rinse zone 13, from which it is conveyed via the wash pump belonging to the wash system of the post-wash or pre-rinse zone 13 to the spray nozzles 3 (post-wash or pre-rinse nozzles) of the post-wash or pre-rinse zone 13. Wash liquid is rinsed off the washware in the post-wash or pre-rinse zone 13.

The liquid that accumulates in the process flows into the wash tank 32 of the main-wash zone 12, is usually provided with a detergent and is sprayed onto the washware with the aid of a wash pump belonging to the wash system of the main-wash zone 12 via spray nozzles (wash nozzles) of the wash system belonging to the main-wash zone 12.

From the wash tank 32 of the main-wash zone 12, the wash liquid subsequently flows into the pre-wash tank 31 of the pre-wash zone 11. The wash liquid collected in the pre-wash tank 31 is sprayed onto the washware with the aid of a wash pump belonging to the wash system of the pre-wash zone via spray nozzles (pre-wash nozzles) of the wash system belonging to the pre-wash zone 11, in order to remove coarse dirt from the washware.

In this case, it is conceivable for some of the wash liquid sprayed in the main-wash zone 12 to pass via an overflow system into the wash tank (pre-wash tank 31) of the pre-wash zone 11. Like the main-wash zone 12, the pre-wash zone 11 can be equipped with a tank covering sieve in the form of a planar sieve. This tank covering sieve is preferably arranged above the wash tank (pre-wash tank 31) of the pre-wash zone 11 in order to separate dirt particles from wash liquid which is sprayed in the pre-wash zone 11 and flows back into the pre-wash tank 31 by gravity. The mesh width of the tank covering sieve is preferably in a range between about 1 mm and 4 mm.

As a result of the heated wash and final rinse liquid, when the latter is sprayed within the wash and final rinse zones 11, 12, 13, 14 of the conveyor dishwasher 1, clouds of steam (vapor) arise. In order to prevent these clouds of steam from passing out of the conveyor dishwasher 1, it is advantageous, in the embodiment schematically illustrated in FIG. 1, for the individual treatment zones and in particular the wash and final rinse zones 11, 12, 13, 14 to be separated off with curtains.

In order to discharge the clouds of steam (vapor) which arise during operation of the conveyor dishwasher 1 and also humid, warm air from the interior of the conveyor dishwasher 1, the conveyor dishwasher 1 is equipped with a machine-side waste air system 20 which is configured to discharge at least the majority of the humid and warm air which arises in the treatment zones 11, 12, 13, 14 during operation of the conveyor dishwasher 1 as waste air out of the respective treatment zones 11, 12, 13, 14 of the machine.

In the embodiment, illustrated in FIG. 1, of the conveyor dishwasher 1 according to the invention, the central waste air system 20 is arranged in the region of the post-wash or pre-rinse zone 13 and the final rinse zone 14. The waste air system 20 has, in the embodiment illustrated, a single waste air fan 4 which is controllable via the control device 100 in order to be able to set the output of the waste air fan 4.

The waste air system 20 further has an associated waste air heat recovery system which is preferably likewise controllable via the control device 100 and which serves to withdraw thermal energy from the waste air which is to be discharged from the conveyor dishwasher 1 by way of the waste air system 20 continuously or as required and thus to cool the waste air which is to be discharged from the conveyor dishwasher 1.

In the following text, the heat recovery system that is used in the exemplary embodiment, schematically illustrated in FIG. 1, of the conveyor dishwasher 1 is described in more detail. Specifically, in the embodiment, schematically illustrated in FIG. 1, of the conveyor dishwasher according to the invention, two different heat recovery systems are realized, namely the abovementioned waste air heat recovery system and a waste water heat recovery system 25, wherein these two systems interact synergistically with one another.

As already indicated in the general part of the description, the heat recovery system according to the invention, consisting of the waste air heat recovery system and the waste water heat recovery system 25, serves in particular for energy recovery (and thus for saving resources during operation of the conveyor dishwasher 1) and for dispensing with on-site waste air discharge installations.

For this purpose, the embodiment, schematically illustrated in FIG. 1, of the conveyor dishwasher 1 according to the invention has the abovementioned waste water heat recovery system 25, which is arranged at the inlet tunnel 10 of the conveyor dishwasher 1 in the exemplary embodiment illustrated. Of course, the waste water heat recovery system 25 can also be arranged at some other point, for example be already formed in an on-site waste water system.

The waste water heat recovery system 25 has a heat exchanger 26 through which fresh water flows. The fresh water comes from a corresponding fresh water source 27, in particular the fresh water mains, and flows preferably in countercurrent through the heat exchanger 26 of the waste water heat recovery system 25.

In addition, at least some of the waste water which is discharged or is to be discharged from the conveyor dishwasher 1 is passed through the waste water heat recovery system 25 and in the process emits at least some of the thermal energy to the cold fresh water flowing preferably in countercurrent. In the process, the fresh water is heated from originally about 15° C. to about 30° C. to 45° C. while the waste water simultaneously cools to about 25° C. to 40° C.

As is schematically indicated in FIG. 1, the fresh water pre-heated with the aid of the waste water heat recovery system 25 is subsequently brought to a higher energy level with the aid of the waste air heat from the conveyor dishwasher 1. Specifically, to this end the conveyor dishwasher 1 schematically illustrated in FIG. 1 has the abovementioned waste air heat recovery system, which operates in accordance with the principle of the heat pump technique.

To this end, the waste air heat recovery system has an evaporator 42 which—as schematically indicated in FIG. 1—is arranged in the machine-side waste air system 20 or at the output of the machine-side waste air system 20. In the evaporator 42, a refrigerant evaporates when the warm and humid waste air from the conveyor dishwasher 1 flows around the evaporator 42.

In this way, during operation of the conveyor dishwasher 1, the machine waste air can be cooled from its originally 45° C., for example, to room temperature or about 18° C. at a relative air humidity of 100%, such that the machine waste air can then be passed directly into the room in which the conveyor dishwasher 1 is installed and in particular an on-site waste air system is no longer required.

The refrigerant evaporated in the evaporator 42 of the heat pump device is compressed by a heat pump compressor 48, following complete evaporation and superheating in the gaseous state, and thus brought to a greater pressure and temperature level. On the high-pressure side of the compressor 48, the thermal energy previously received from the hot and humid waste air is then emitted in sequence, as useful heat or heat output, to the wash liquid which is to be sprayed in the main-wash zone 12, to the drying air which is to be introduced into the drying zone 15 with the aid of the fan 21, and subsequently to the final rinse liquid (fresh water) which has already been pre-heated with the aid of the waste water heat recovery system 25 and is to be sprayed in the final rinse zone 14. Of course, any other order is also possible for this purpose.

Of particular note in this connection is the fact that the thermal energy recovered from the waste air from the conveyor dishwasher 1 is used in particular for further heating of the final rinse liquid which has already been pre-heated with the aid of the waste water heat recovery system 25. For this purpose, the heat pump device has an associated first condenser or heat exchanger 44 in order to be able to transfer at least a portion of the thermal energy of the refrigerant as useful heat to the final rinse liquid which is to be sprayed in the at least one final rinse zone 14. In this case, provision is made in particular for the heat exchanger 26 of the waste water heat recovery system 25 to be arranged upstream of the first condenser or heat exchanger 44 of the heat pump device as seen in the direction of flow of the final rinse liquid which is to be sprayed in the final rinse zone 14, in order in this way to be able to pre-heat the liquid which is to be sprayed in the final rinse zone.

As is indicated schematically in FIG. 1, the solution according to the invention is not, however, limited to embodiments in which the thermal energy recovered from the waste air is used only for the further heating of the final rinse liquid which is to be sprayed in the final rinse zone 14. Rather, use is made, in the embodiment illustrated in FIG. 1, of second and third condensers or heat exchangers 45, 46 which (like the first condenser or heat exchanger 44 of the heat pump system) are associated with the heat pump system and thus with the waste air heat recovery system. Via these additional condensers or heat exchangers 45, 46, the thermal energy recovered from the waste air can be emitted as heat output to the wash liquid which is to be sprayed in the main-wash zone 12 and to the drying air which has been introduced or is to be introduced into the drying zone 15. In this case, the refrigerant of the heat pump device condenses and supercools before it expands via an expansion valve 47, and as a result a lower pressure level is achieved.

As is indicated schematically in FIG. 1, the final rinse zone 14 also has an associated (alternative) heating device 26, wherein the latter is in particular an electrically operated heating device or an additional heating device which is operated with steam or gas and is formed independently of the heat pump device or the waste water heat recovery system 25. By way of this additional (alternative) heating device 26, the final rinse liquid which is to be sprayed in the final rinse zone 14 can be supplied with thermal energy as required and independently of the heat pump device or the waste water heat recovery system 25, in order that the final rinse liquid which is to be sprayed in the final rinse zone 14 is always at a previously defined or definable minimum process temperature of for example at least 65° C.

In a similar manner to the above-described first embodiment, in the case of the conveyor dishwasher 1 schematically illustrated in FIG. 2, the final rinse liquid which is to be sprayed in the final rinse zone 14 is pre-heated via the useful heat provided by the waste water heat recovery system 25, and then heated further via the useful heat provided by the heat pump device, wherein the required minimum process temperature is optionally also achieved by connecting an alternative heating device 26.

In contrast to the first embodiment, illustrated in FIG. 1, of the conveyor dishwasher 1 according to the invention, the second embodiment, illustrated in FIG. 2, has a further (fourth) condenser or heat exchanger 43 which is associated with the post-wash or pre-rinse zone 13 and is configured, during operation of the conveyor dishwasher, to at least partially emit the thermal energy previously recovered from the waste air of the machine to the wash liquid which is to be sprayed in the post-wash or pre-rinse zone 13.

Specifically, in this case, the fourth condenser or heat exchanger 43 is integrated or arranged in the wash tank 33 of the post-wash or pre-rinse zone 13. This embodiment is also used—as schematically illustrated in the appended drawings—in the (second) condenser or heat exchanger 45 which is associated with the main-wash zone 12 and is likewise integrated or arranged in the corresponding wash tank 32 of the main-wash zone 12.

In the embodiment schematically illustrated in FIG. 2, it should be noted in particular that the further (fourth) condenser or heat exchanger 43 is arranged upstream of the other condensers or heat exchangers 44, 45, 46, as seen in the direction F of flow of the refrigerant, in order to transmit as high a proportion of useful heat as possible to the wash liquid which is to be sprayed in the post-wash or pre-rinse zone 13.

The invention is not limited to the embodiments described in connection with the drawings.

The invention claimed is:

1. A conveyor dishwasher having a conveying apparatus for conveying washware through individual treatment zones of the conveyor dishwasher, wherein the conveyor dishwasher has at least one wash zone in which wash liquid from a wash tank which is associated with the at least one wash zone is sprayed onto the washware, wherein the conveyor dishwasher further has at least one final rinse zone which is arranged downstream of the at least one wash zone as seen in a conveying direction of the washware and in which final rinse liquid is sprayed onto the washware, and wherein the conveyor dishwasher further has a waste air system for discharging waste air from the conveyor dishwasher, characterized in that a waste water heat recovery system is provided for transferring at least a portion of the thermal energy in the waste water from the conveyor dishwasher as heat to the final rinse liquid which is to be sprayed in the at least one final rinse zone, and in that a waste air heat recovery system is further provided for transferring at least a portion of the thermal energy in the waste air which is discharged or is to be discharged from the conveyor dishwasher as heat to at least the final rinse liquid which is to be sprayed in the at least one final rinse zone.

2. The conveyor dishwasher as claimed in claim 1, wherein the waste water heat recovery system has at least one heat exchanger, which is operated in accordance with the countercurrent principle, for transferring at least a portion of the thermal energy in the waste water as heat to the final rinse liquid which is to be sprayed in the at least one final rinse zone; and wherein the waste air heat recovery system has at least one heat pump device for transferring at least a portion of the thermal energy in the waste air as heat to at least the final rinse liquid which is to be sprayed in the at least one final rinse zone.

3. The conveyor dishwasher as claimed in claim 2, wherein the heat pump device has at least one evaporator for transferring at least a portion of the thermal energy in the waste air to a refrigerant of the heat pump device; and wherein the heat pump device further has a first condenser/heat exchanger for transferring at least a portion of the thermal energy in the refrigerant as heat to the final rinse liquid which is to be sprayed in the at least one final rinse zone.

4. The conveyor dishwasher as claimed in claim 3, wherein the at least one heat exchanger of the waste water heat recovery system is arranged upstream of the first condenser/heat exchanger of the heat pump device as seen in the direction of flow of the final rinse liquid which is to be sprayed in the at least one final rinse zone, for preheating the final rinse liquid which is to be sprayed in the final rinse zone.

5. The conveyor dishwasher as claimed in claim 3, wherein the evaporator of the heat pump device is designed to cool the waste air which is discharged or is to be discharged from the conveyor dishwasher to a temperature in a range of between 18° C. and 25° C., in particular to ambient temperature in the room in which the conveyor dishwasher is installed, during operation of the conveyor dishwasher.

6. The conveyor dishwasher as claimed in claim 3, wherein the heat pump device further has a second condenser/heat exchanger which is designed to transfer at least a portion of the thermal energy in the refrigerant as heat to the wash liquid which is to be sprayed in the at least one wash zone of the conveyor dishwasher.

7. The conveyor dishwasher as claimed in claim 6, wherein the second condenser/heat exchanger is arranged upstream of the first condenser/heat exchanger as seen in a direction of flow of the refrigerant.

8. The conveyor dishwasher as claimed in claim 7, wherein a drying zone is further provided, said drying zone being arranged downstream of the at least one final rinse zone as seen in the conveying direction of the washware; and wherein the heat pump device further has a third condenser/heat exchanger which is designed to transfer at least a portion of the thermal energy in the refrigerant as heat to drying air which is introduced or is to be introduced into the drying zone.

9. The conveyor dishwasher as claimed in claim 8,
wherein the third condenser/heat exchanger is arranged upstream of the first condenser/heat exchanger as seen in a direction of flow of the refrigerant.

10. The conveyor dishwasher as claimed in claim 9,
wherein a pre-rinse zone is provided, said pre-rinse zone being arranged between the at least one wash zone and the at least one final rinse zone as seen in the conveying direction of the washware; and
wherein the heat pump device further has a fourth condenser/heat exchanger which is designed to transfer at least a portion of the thermal energy in the refrigerant as heat to pre-rinse liquid which is to be sprayed in the pre-rinse zone.

11. The conveyor dishwasher as claimed in claim 10,
wherein the fourth condenser/heat exchanger is arranged upstream of the first condenser/heat exchanger as seen in a direction of flow of the refrigerant.

12. The conveyor dishwasher as claimed in claim 11,
wherein the third condenser/heat exchanger is arranged downstream of the second condenser/heat exchanger as seen in the direction of flow of the refrigerant.

13. The conveyor dishwasher as claimed in claim 12,
wherein the fourth condenser/heat exchanger is arranged upstream of the second condenser/heat exchanger as seen in the direction of flow of the refrigerant.

14. The conveyor dishwasher as claimed in claim 2,
wherein the heat exchanger of the waste water heat recovery system is designed to preheat the final rinse liquid, which is to be sprayed in the at least one final rinse zone, from originally 13° C. to 17° C. to 30° C. to 45° C. during operation of the conveyor dishwasher.

15. The conveyor dishwasher as claimed in claim 14,
wherein the heat pump device of the waste air heat recovery system is designed to further heat the final rinse liquid, which was pre-heated to 30° C. to 45° C. by the waste water heat recovery system and is to be sprayed in the at least one final rinse zone, to 50° C. to 65° C. during operation of the conveyor dishwasher.

16. The conveyor dishwasher as claimed in claim 1,
wherein a heating device which is associated with the at least one final rinse zone is further provided for heating the final rinse liquid which is to be sprayed in the at least one final rinse zone (14) to or above a previously defined or definable final temperature as required.

17. The conveyor dishwasher as claimed in claim 16,
wherein the previously defined or definable final temperature depends on a selected treatment program of the conveyor dishwasher and is at least 65° C. or at least 80° C.

18. The conveyor dishwasher as claimed in claim 16,
wherein the heating device which is associated with the at least one final rinse zone is designed to heat the final rinse liquid which is to be sprayed in the at least one final rinse zone to the previously defined or definable final temperature using electrical energy, steam, gas or hot water.

19. A method for operating a conveyor dishwasher which has at least one wash zone and at least one final rinse zone which is arranged downstream of the at least one wash zone as seen in a conveying direction of the washware, wherein the method comprises the following method steps:
  i) at least a portion of the thermal energy in the waste water which is to be discharged or is discharged from the conveyor dishwasher is transferred as heat to the final rinse liquid, which is to be sprayed in the at least one final rinse zone, with the aid of a waste water heat recovery system; and
  ii) at least a portion of the thermal energy in the waste air which is discharged or is to be discharged from the conveyor dishwasher is transferred as heat to at least the final rinse liquid, which is to be sprayed in the at least one final rinse zone, with the aid of a waste air heat recovery system.

* * * * *

UNITED STATES PATENT AND TRADEMARK OFFICE
CERTIFICATE OF CORRECTION

PATENT NO. : 10,456,007 B2
APPLICATION NO. : 15/309806
DATED : October 29, 2019
INVENTOR(S) : Harald Disch and Martin Schrempp It is certified that error appears in the above-identified patent and that said Letters Patent is hereby corrected as shown below:

On the Title Page

Under item (57), abstract "19 Claims, 2 Drawing Sheets" should read --20 Claims, 2 Drawing Sheets--

In the Claims

Column 12, Line 37, Claim 20 is allowed and should be added to read as follows:
--20. A conveyor dishwasher, comprising:
  a conveying apparatus for conveying washware through individual treatment zones of the conveyor dishwasher,
  wherein the conveyor dishwasher has at least one wash zone in which wash liquid from a wash tank which is associated with the at least one wash zone is sprayed onto the washware,
  wherein the conveyor dishwasher further has at least one final rinse zone which is arranged downstream of the at least one wash zone as seen in a conveying direction of the washware and in which final rinse liquid is sprayed onto the washware,
  wherein the conveyor dishwasher further has a waste air system for discharging waste air from the conveyor dishwasher,
  wherein a waste water heat recovery system is provided for transferring at least a portion of the thermal energy in the waste water from the conveyor dishwasher as heat to the final rinse liquid which is to be sprayed in the at least one final rinse zone, and
  wherein a waste air heat recovery system is further provided for transferring at least a portion of the thermal energy in the waste air which is discharged or is to be discharged from the conveyor dishwasher as heat to at least the final rinse liquid which is to be sprayed in the at least one final rinse zone.--

Signed and Sealed this
Twenty-sixth Day of November, 2019

Andrei Iancu
*Director of the United States Patent and Trademark Office*